United States Patent [19]

Roese et al.

[11] 4,424,529
[45] Jan. 3, 1984

[54] REMOTELY TRIGGERED PORTABLE STEREOSCOPIC VIEWER SYSTEM

[76] Inventors: John A. Roese, 6315 Camino Corto, San Diego, Calif. 92120; A. Franklin Turner, 748 S. El Molino Ave., Pasadena, Calif. 91106

[21] Appl. No.: 126,216

[22] Filed: Mar. 3, 1980

Related U.S. Application Data

[63] Continuation-in-part of Ser. No. 854,259, Nov. 23, 1977, Pat. No. 4,214,267.

[51] Int. Cl.³ .............................................. H04N 9/54
[52] U.S. Cl. ...................................... 358/88; 358/92; 352/63
[58] Field of Search ........................... 358/88, 92, 91; 350/130, 131, 132; 352/62, 63

[56] References Cited

U.S. PATENT DOCUMENTS

| | | | |
|---|---|---|---|
| 3,621,127 | 11/1971 | Hope | 358/92 |
| 3,737,567 | 6/1973 | Kratomi | 178/6.5 |
| 3,903,358 | 9/1975 | Roese | 358/92 |
| 4,021,846 | 5/1977 | Roese | 358/92 |
| 4,286,286 | 8/1981 | Jurisson et al. | 358/92 |

Primary Examiner—Robert L. Griffin
Assistant Examiner—Edward L. Coles
Attorney, Agent, or Firm—Trask & Britt

[57] ABSTRACT

A stereoscopic viewer system receives a synchronization signal input from a left-right stereoscopic image pair production system. A viewer system has a transmitter and a modulator associated therewith to transmit into a medium a carrier signal modulated with the synchronization signal. A transmitted signal is received by a receiver which has a demodulator to extract the synchronization signal and to supply it to switching logic. The switching logic supplies switching signals to alternately operate selectively and in accordance with the synchronizing signal each of a pair of electro-optic shutters between the maximum and minimum optical transmission state. Each shutter is positioned in the line of sight of one of the eyes of a user. The system receiving means is powered by a battery power supply.

18 Claims, 15 Drawing Figures

REMOTELY TRIGGERED PORTABLE STEREOSCOPIC VIEWER SYSTEM

RELATED INVENTIONS

This application is a continuation-in-part of United States Patent Application Ser. No. 854,259, filed Nov. 23, 1977, which is now issued as U.S. Pat. No. 4,214,267.

BACKGROUND OF THE INVENTION

1. Field:

This invention relates to electro-optic devices and stereoscopic viewing systems. More particularly, this invention relates to stereoscopic viewing system employing electro-optic shutter devices for use with a left-right stereoscopic image pair production system.

2. State of the Art:

Various devices have been constructed to produce what in effect may be regarded as or termed stereoscopic images. These images are a three-dimensional image as perceived by the person monitoring or viewing the image. In the past, there have been several basic types of stereoscopic viewing devices which have been used with varying degrees of success. These various devices are characterized by the type of image separation and viewer mechanism employed to isolate distinct left and right perspective images. Briefly, these systems include refracting and reflecting stereoscopes, anaglyphic filters, polarized filters, electro-mechanical shutters and electrically controlled optical light valves. Although these systems have contributed to the advance of the fundamental knowledge in the field of stereoscopic viewing techniques, each system has principal drawbacks which limit its usefulness. Refracting and reflecting stereoscopes, for example, are simple in design but at the same time have inherent disadvantages. The left and right eye images in such systems must be continuously displayed in a side-by-side format which in turn reduces the effective area of the display device used or necessitates the use of two separate display devices. Such stereoscopic systems require that the head of the observer be held at a proper and relatively fixed horizontal orientation and preferably at a particularly selected distance or range from the viewing screen to ensure an optical super-position of the left and right eye images and to effect a proper perspective view of the three-dimensional image. In such systems it has been empirically found that a user frequently experiences eye and muscle strain with prolonged use. Further, the relatively fixed head position has been found to be delimiting to users.

Polarizing devices similarly impose horizontal positioning restrictions on the observer's head (eyes). Also, stereoscopic systems using anaglyphic filtering devices are not particularly compatible with color presentations. Electro-mechanical shutter devices are satisfactory for stereoscopic image presentations, but require bulky viewers with rotating or shifting shutter mechanisms. Difficulties are commonly experienced with these devices in maintaining proper synchronization. Further, the mechanical apparatus are typically subject to frequent failure of the shutter drive mechanisms.

A representative mechanical shutter system is disclosed in U.S. Pat. No. 3,621,127 in which mechanical shutters are operated by a motor. Failure of the motor or failure of the motor to maintain synchronization would obviously result in a confused or non-observable image. Further, the system therein disclosed has limitations by virtue of images produced to be observed through the viewer. The weight of the motor driven system is also a negative factor in that it would become difficult, and perhaps eventually hurtful to the user to wear the viewers for any extended period of time.

Recently, electronically controlled electro-optic shutters have been disclosed to more efficiently and practically permit alternating left image and right image viewing by a user of a single or separate screen system. Electronically controlled nematic liquid crystals may be used as light valves, as disclosed in U.S. Pat. No. 3,821,466. Similar devices are disclosed in U.S. Pat. No. 4,021,846. High optical contrast ratios and rapid switching times are not achievable with such devices. However, these devices have proven to be workable for stereoscopic viewing systems. However, these electro-optic devices are not optimal devices. The user is frequently restricted by the length and by the cumbersome set of interconnecting wires used to transmit synchronizing signals to the shutters. Also, the shutters continue to operate notwithstanding the orientation of the user towards or away from the viewing screen or viewing surface, thus limiting the viewer's vision when the viewer wishes to observe objects other than the three-dimensional or stereoscopic image.

SUMMARY OF THE INVENTION

A stereoscopic viewer system includes transmission means, receiving means, electro-optic shutter means and positioning means. The transmission means is connected to receive a synchronizing signal from a left-right stereoscopic image pair production device. The transmission means includes a first power supply to supply power to a carrier generator connected to supply a carrier signal to a modulator. The modulator receives the carrier signal and the synchronizing signal and in turn supplies an output which is the carrier signal modulated by the synchronizing signal. A transmitter is connected to receive the modulated signal and transmit it into the surrounding medium. The receiving means is positioned remote from the transmission means to receive the modulated carrier signal and generate a switching signal. The receiving means has a receiver to receive the transmitted modulated carrier signal from the medium. The demodulator receives the modulated signal and also obtains power from a second power supply. The demodulator extracts the synchronizing signal and supplies it to switching logic. The switching logic generates switching signals and supplies them to a pair of electro-optic shutter means. Each electro-optic shutter means is connected to the switching logic and receives the switching signals selectively and in accordance with the synchronizing signal so as to alternatingly operate between maximum and minimum optical transmission states. Positioning means are associated with the electro-optic shutter means to position each of the electro-optic shutters in a line of sight of one of the eyes of the user.

In one embodiment, the transmitter means is an acoustical transducer to transmit acoustic signals into a medium; and the receiver means is an acoustical transducer of the type to receive acoustical transmissions from a medium.

In another embodiment, the transmitter means may be an optical signal generator; and the receiver means may be a detector of optical signals.

In yet another embodiment, the transmitter means is a radio frequency antenna; and the receiver means is a radio frequency antenna of the type to receive radio frequency transmissions from the transmitter means.

In a preferred embodiment, the power supply of the receiving means is a battery, and most preferably a rechargeable battery. A charging device may be associated with a tray structure to hold the receiving means when not in use and simultaneously recharge the battery to maintain it in a continuous state of charge. The positioning means is preferably eye glass frame structure.

In a highly preferred embodiment, the receiving means is mechanically associated with the eye glass frames. In another embodiment, the electro-optic shutter means are lanthanum modified lead zirconate titanate (PLZT) electro-optic shutters. The electro-optic shutters may also be liquid crystal electro-optic shutters. In another embodiment, positioning means may have structure means associated therewith to substantially block background light from the eyes of the user.

In a preferred embodiment, the switching logic has means to supply simultaneous switching signals to both of the electro-optic shutters to cause both of the shutters to maintain a maximum optical transmission state in the absence of a synchronizing signal from the receiving means via the demodulator. The receiver may preferably by a directional receiver to receive signals from the transmitter means only when preselectedly oriented toward a preselected point.

BRIEF DESCRIPTION OF THE DRAWINGS

In the drawings, which illustrate what is presently regarded as the best mode for practicing the invention.

DESCRIPTION OF THE ILLUSTRATED EMBODIMENT

Figure 1:
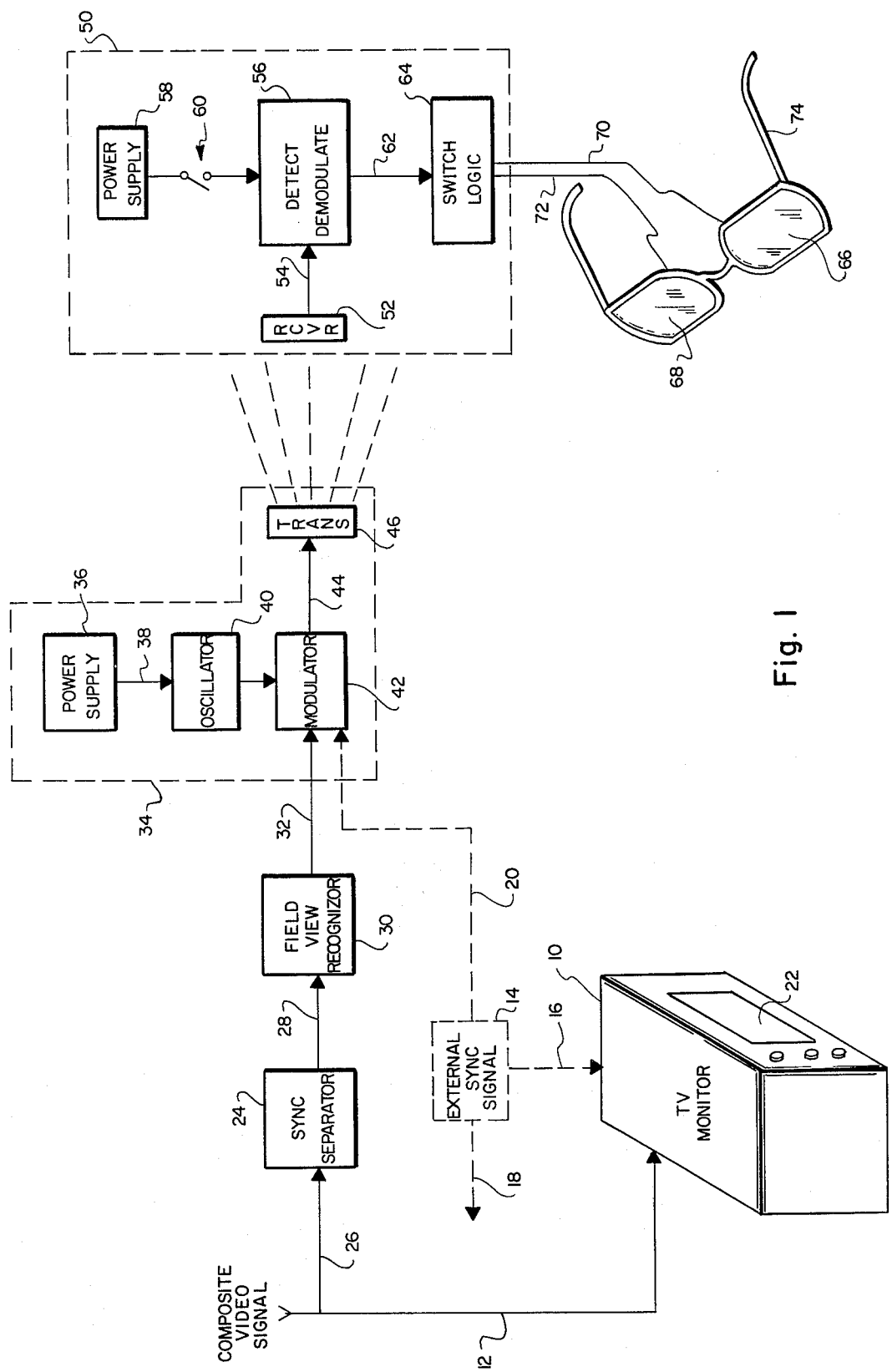
FIG. 1 is a simplified block diagram of a stereoscopic viewing system of the instant invention.

FIG. 1 illustrates in simplified format the stereoscopic viewer system of the instant invention in association with a left-right stereoscopic image pair production system. The image production system is here partially shown to include a TV monitor 10 which receives a composite video signal via conductor 12 from a composite video signal generating system such as that disclosed and illustrated in the parent application hereto. Other left-right stereoscopic image pair production means may also be used or employed with respect to the stereoscopic viewer system herein disclosed. The essentials of the left-right stereoscopic image pair production device are to produce a left image for observation by the left eye of a viewer and a right image for observation by the right eye of the viewer in a synchronized format sufficiently fast to produce a perceived three-dimensional image and most preferably fast enough to preclude the appearance of a flicker to the observer.

The system disclosed in the parent application, as well as in this particular application, is a television system in which a conventional 2:1 interlace raster scan mode is used. However, it should be noted that virtually any form of video signal in which a synchronization pulse is generated from an external source 14 or internally from within the image production system is employable. A dotted line format shows the use of an external synchronous signal generator 14 supplying a synchronizing signal via dotted line conductor 16 to the conventional television monitor 10, via conductor 18 to an image production system and via conductor 20 to the stereoscopic viewer system of the instant invention.

Image producing devices or systems which can be used or adapted to stereoscopic imagery include a computer graphic image generating system and a movie film system in which a synchronizing pulse is developed therewithin relating to the projection of alternating left and right images on an appropriate viewing screen.

However, as discussed, the invention herein is presently disclosed in the context of an embodiment relating to a television video system in which alternating left and right images are presented on the screen 22 of the television monitor 10. With a composite video signal supplied to the television monitor 10, a synchronization separate 24 extracts the synchronization signal from the composite video signal delivered to the separator via conductor 26. The synchronization separator supplies the synchronization signal via conductor 28 to a field or view recognizer circuit 30. The field or view recognizer circuit differentiates between the field scans (odd/even) and supplies the synchronizing signal output via conductor 32 to the transmission means 34 of the stereoscopic viewing system of the instant invention.

The transmission means 34 has associated therewith a power supply 36. As here shown, the power supply 36 is an independent source of power. Those skilled in the art will recognize that any convenient power supply may be adapted to supply power from within the stereoscopic image producing system or means. In the absence of a readily available power supply within the stereoscopic image producing means, an independent power supply may be adapted to receive conventional power, such as 115 volt AC power and in turn reduce and supply the necessary voltage and amperage to operate the other components of the transmission means 34 of the stereoscopic viewer system. Power supply output is here shown being supplied via conductor 38 to an oscillator 40. The oscillator 40 here shown is a radio frequency (RF) oscillator to provide a carrier signal to the modulator 42. The modulator 42 receives the output of the oscillator 40 and the synchronization signal via conductor 32 (or conductor 20) to supply a modulated carrier output signal via conductor 44 to a transmitter 46. For an RF system, the transmitter 46 is a simple radio frequency transmitting antenna to transmit a radio frequency signal which is the modulated carrier signal.

The stereoscopic viewer system of the instant invention further includes receiving means 50 which are positioned remote from the transmission means 34. The receiving means 50 include a receiver 52 which, in the RF system heretofore discussed, is a conventional radio frequency receiving antenna.

The antenna output is supplied via conductor 54 to a detecting and demodulating circuit 56. The detecting and demodulating circuit 56 receives power from a power supply 58 via an off-on switch 60. The on-off switch may be any number of different switches to interrupt the supply of power from the power supply 58 to the demodulator 56. It is here shown to be a simple single-pole single-throw switch 60. The demodulator 56 receives the modulated carrier signal received by the receiver 52 via conductor 54 and extracts therefrom the synchronizing signal and supplies it via conductor 62 to switching logic 64. The switching logic 64 receives the synchronizing signal and supplies an output switching signal to a pair of electro-optic shutters, which are here shown to be a left shutter 66 and a right shutter 68. The output is supplied via conductor means 70 and 72 respectively. As shown, the electro-optic shutters 66 and 68 have positioning means mechanically associated therewith which are here shown to be eye glass frames 74, as more fully discussed and illustrated hereinafter. The eye glass frames 74 are used to position the left 66 and right 68 electro-optic shutters in the line of sight of the respective left and right eyes of the user when the user is oriented to monitor or watch the screen 22 of the TV monitor 10 of the left-right stereoscopic image pair display means.

In operation, the left-right stereoscopic image pair production system produces in alternating sequence left-right perspective images on the screen 22. The synchronizing signal related to production of those left and right perspective images is first extracted from the video signal and then transmitted to the stereoscopic viewer system. The viewer system transmission means 34 communicates the synchronization signal to the receiving means 50. The synchronizing signal is in turn extracted and used to operate in respective sequence the left 66 and right 68 electro-optic shutters between maximum and minimum light transmission states. As a result, the user will observe through his left eye (during the maximum light transmission state of the left 66 electro-optic shutter) and the left perspective image being produced on screen 22. Similarly, the user will observe with his right eye (during the right electro-optic shutter 68 maximum transmission state) the right perspective image being produced on the screen 22. Of course, when one shutter (66 or 68) is in a maximum light transmission state, the other (66 or 68) is in a minimum transmission state. By alternating between the left and right images at a rapid rate, preselected and otherwise associated with the stereoscopic image production system, the user perceives a three-dimensional visual image.

The transmitter means 46 and receiver means 52, as hereinbefore described, are a conventional radio frequency transmitting antenna and receiving antenna, respectively. Similarly, the oscillator 40 and modulator 42, as well as the detector and demodulator 56, are radio frequency circuits which are exemplified in greater detail hereinafter. However, it should be noted that communication of the synchronization signal by the transmission means 34 to the receiving means 50 can be effected over the entire electro-magnetic spectrum, optical spectrum and acoustic spectrum.

The optical spectrum signals include, but are not limited to, radiation at infrared, visible and ultraviolet frequencies. The transmitter 46 may be of such a character as to transmit modulated infrared, visible and ultraviolet frequencies. That is, the oscillator 40 may in effect be combined with the modulator 42 as necessary to generate a modulated carrier signal of the appropriate frequency. Similarly, the receiver 52 may be of such a character as to receive infrared, visible and ultraviolet frequencies. The receiver 52 will in turn supply a modulated signal via conductor 54 to the demodulator 56. Various photoelectric cells, with or without optics, can be devised to be sensitive to and act as receivers of the infrared, visible and ultraviolet frequencies, as known to those skilled in the art.

The transmitter 46 and receiver 52 may also be acoustic devices. That is, the transmitter 46 may be a transducer to transmit acoustic signals including ultrasonic, audible and subsonic frequencies as desired for a particular environment. The receiver 52 would similarly be a transducer to receive, as appropriate, the ultrasonic, audible and subsonic frequencies being transmitted by the trnsmitter 46.

Conventional radio frequency electroc-magnetic transmission and reception would be preferred in most applications. A transmitting and receiving system using a carrier signal is typical. However, the transmitting and receiving arrangement can also operate on the suppressed carrier principle. Special conditions, such as use in an area of high electrical interference or in an area where selected electro-magnetic interference would be highly undesirable, may necessitate the use of alternate means for transmitting and receiving such as the optical and acoustic means as hereinbefore discussed.

As noted, the stereoscopic image production means may be any kind of system to generate left-right stereoscopic image pairs on the screen 22 which may be a movie screen, a TV screen, a cathode-ray-tube (CRT) screen, or any other display device, as the case may be. The synchronization signal can be obtained from a computer generated signal and a computed graphic display device employing either raster scan or vector stroke techniques to generate the stereoscopic views. Any data source of the display combination capable of displaying the alternating stereoscopically complimentary left and right images can be used. The UNIVAC 1108 computer with a Comtal 8300 color raster scan display and a Data General Nova 3 computer with a Megatek Megraphic 5000 vector stroke display have proven satisfactory. Data recording and play back devices, such as magnetic disks and tapes, have also been used as the source of the data to be displayed stereoscopically. A synchronization signal to be supplied via conductor 20 can be extracted from any number of different locations within such a system and supplied to the transmission means 34 of the stereoscopic viewer system of the instant invention.

It should be noted that the synchronization signal does not necessarily have to be a constant. The left-right stereoscopic image pair production system employed in which stereoscopically related left-right images are presented on the screen 22 may vary depending upon the type of display employed and/or production system employed. Although the rate and duty cycle may affect the quality of the perceived three-dimensional image, the basic requirement is that the electro-optic shutters 66 and 68 of the viewer receive synchronization signals which are synchronized with the alternation of the left and right images. It is also important to recognize that means must be made available to identify the left and right image signals. The field view recognizer circuit 30 as hereinafter discussed and illustrated does so. Alternatively, means must be included to develop the correct orientation of the perceived image, as more fully discussed hereinafter.

As mentioned hereinbefore, the display screen 22 could be a motion picture screen on which a motion picture image is projected by an appropriate projector. The left and right images may be produced by projecting alternatingly a left eye view and a right eye view in alternate frames of a single film or by the use of two projectors with a synchronized film arrangement to project alternating left and right views. The stereoscopic viewer (i.e., electro-optic shutters) would in turn switch its shutters 66 and 68 in synchronization with the display of the left and right eye views. The transmission means 34 could readily be adapted to receive a synchronizing signal from the projector(s).

Figure 2:
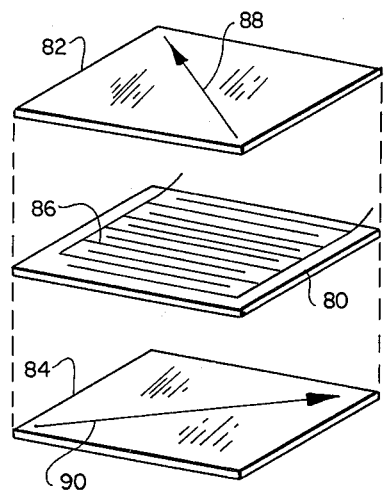
FIG. 2 is a perspective representative view of a PLZT electro-optic shutter assembly.

Referring now to FIG. 2, a lanthanum modified lead zirconate titanate (PLZT) electro-optic shutter device is shown similar to that illustrated and described in the parent application hereto. The lanthanum modified lead zirconate titanate electro-optic shutter has a wafer 80 sandwiched between a front polarizer 82 and a rear polarizer 84. The front polarizer 82 has an axis of polarization normal to the axis of polarization of the rear polarizer 84. Interdigital electrodes 86 are attached or layed on one or both surfaces of the PLZT wafer 80, as illustrated in FIG. 2. The front 82 and rear 84 polarizers may be any satisfactory high contrast ratio polarizing material. Polarizing material known as "Polaroid HN-38S" having a contrast ratio greater than 1000:1 has proven satisfactory. The polarizers 82 and 84 may be self-supportive or may be rigidly held adjacent to or cemented to a plate of glass or other transparent supporting material. The PLZT wafers are of a 9/65/35 or similar composition known as PLZT ceramic material. The electrodes 86 are of chrome-gold, tin oxide or other material of similar electrical characteristics. The electrodes 86 can be deposited on the PLZT wafer 80 in an interdigital pattern, as illustrated. A typical electrode width is 3 mils with 40 mils spacing. Alternate arrangements are known.

In operation, randomly polarized light from the television monitor 10 passes through the front polarizer 82 and is linearly polarized with an axis of polarization 88 as shown. When no electric field is applied to the electrodes 86, the polarized light passes through the PLZT wafer 80 and is incident on rear polarizer 84 with an axis of polarization at 90° to the axis of polarization of front polarizer 82. The light therefore suffers maximum attenuation in passing through the rear polarizer 84. This may be regarded as the "off" state of the electro-optic shutter. When the proper electrical switching signal is supplied to the electrodes 86, the PLZT rotates the axis of polarization of the light passing through the front polarizer 82 by 90°. This causes the axis of polarization of the light to be aligned with the axis of polarization 90 of the rear polarizer 84; and thus the light passes through the rear polarizer 84 with minimum attenuation. This is the maximum transmission or "on" state of the shutter. A separate shutter is used for both the left eye 66 and the right eye 68, as shown in FIG. 1.

Referring back to FIG. 2, it should be noted that the front polarizing material 82 of a PLZT electro-optic shutter assembly, as illustrated in FIG. 21, may be self-supportive. Alternately, front polarizing material 82 can be rigidly held adjacent to or cemented to a plate of glass or other transparent supporting material. The glass plate can be coated with magnesium chloride or other material with light optical properties to suppress reflections at the air/glass interface. Still alternately, the glass plate can be laminated with the polarizing material being the front surface of the shutter assembly. The next element of the shutter assembly would in turn be the PLZT ceramic wafer 80. As hereinbefore noted, these wafers are preferably of a 9/65/35 composition indicating proportional parts of the constituent elements. The PLZT ceramic wafers can be polished with thickness of approximately 15 mils. The electrodes 86 may be deposited on the wafer or otherwise brought close enough to the wafer 80 so as to place the ceramic wafer 80 in the electric field of the electrodes 86 when they are energized. One set of electrodes can be deposited on one side of the wafer 80 and the other set on the reverse side thereof. Alternately, grooves may be cut in the ceramic wafer 80 for the electrodes in accordance with good electro-optical design practice. In order to minimize surface reflections at the polarizer/PLZT ceramic interfaces, additional anti-reflective coatings may be used on either side of the PLZT ceramic wafer 80.

An alternate method of construction of the PLZT electro-optic shutter assembly is to fill the volume between the front and rear polarizers 82 and 84, respectively, and the PLZT wafer with a material having a refractive index which more closely matches the refractive index of the PLZT (normally about 2.5) in air. This reduces the internal reflections in the assembly itself. If this material is also a resilient gel, it may provide an acoustic damping action on the piezoelectric motion of the PLZT wafer which results from switching the field applied to the electrodes on and off in repetitive fashion. One material which has both properties and has been found to be satisfactory is known as General Electric RTV619.

In yet another method of construction, the front polarizer 82 could be placed on the surface of the television screen 22. The orientation of the polarizing material on the screen 22 would be the same as previously illustrated for the complete PLZT shutter assembly when the stereoscopic viewer was held in a horizontal plane relative to the television screen surface 22. The main advantage of this implementation is that an observer may look away from the television screen 22 while wearing the stereoscopic viewer glasses with a minimum of visual impairment. This is due to the optical shuttering mechanism no longer being in effect, as the front polarizer has effectively been removed. That is to say, both PLZT shutters would be in an "on" condition. When in the "on" condition, light sufficient for visualization of most objects would be available to the user. Some weight reduction advantage may also be realized in the shutter and eye glass frame assembly. A particular disadvantage of the implementation is that slight head movements about an axis inconsistent with the front polarizer axis would adversely affect the stereoscopic and visual images observed by the user and produce ghost images.

Another method of constructing the PLZT electro-optic shutters 66 and 68 is available. In such a method, the front polarizer 82 is replaced by a quarter wave plate known to those skilled in the art. Such a plate is optically transparent material of the proper thickness so as to retard the phase of an optical wave passing through it by one-quarter wavelength. Such materials are well known to practioners of the optical arts. A large sheet of circularly polarizing material is placed on the surface of the television monitor tube 22. Such circular polarizers are available from several companies, one of which is the Polaroid Corporation. This circularly polarizes the light from the television monitor 22. After going through the quarter wave plate, the PLZT ceramic wafer 80, electrodes 86 and rear polarizer 84 operate as hereinbefore discussed. In this application the disadvantages experienced by using a linear polarizer on the surface of the screen 22 are minimized because the circular polarizer produces a polarization independent of head tilt. That is, the observer may move his head in any particular plane without affecting the visualization being experienced through the PLZT shutter assembly.

The preferred electro-optic shutter is presently the shutter employing PLZT wafers, as illustrated in FIG. 2. However, other electro-optic materials can also be used. For example, nematic liquid crystals can be employed as electronically controlled light valves with a shutter assembly similar to that described in the PLZT ceramics.

The liquid crystal electro-optic shutters are of interest principally because of their electro-optical effects. These effects arise from changes in the arrangements in the liquid crystal molecules which can be induced by an applied electric field. The important electro-optical effects observed in the nematic liquid crystals include deformation of vertically aligned phases, twisted nematic effects and dynamic scattering. These effects and their use as electro-optic shutters are described in more detail in E. B. Priestley, et al, editors, *Introduction to Liquid Crystals,* Plenum Press, New York, 1975; "Liquid Crystal Display Devices," *Scientific American,* April 1970, pp. 100–106; and "Liquid Crystals—Perspectives, Prospects and Products," *Electro-Optical Systems Design,* Feburary 1972, pp. 20–31.

Several other electro-optic materials can be used to make shutters for the stereoscopic viewer. An example is the material known as Varad produced by Mark's Polarized Corporation. The use of this material as a shutter is described more fully in J. A. Carpenter and W. R. Peters, "Dipole Shutters—A Transparency For Eye Protection," USFA School of Aerospace Medicine Technical Report SAM-TR68-0136, December 1968.

Other materials which are suitable for light valve and light modulation application are known. These materials employ several different physical principals in operation including Faraday effect, Cotton-Mouton effect, electro-optic and magneto-optic Kerr effects, Majorana effect, Voight effect, Zeeman effect, and acousto-optic effects including Bragg, Raman-Nath and surface acoustic wave effects. The materials displaying these effects are described in the following references: J. Bordogna, S. A. Keneman, and J. J. Amodei, "Recyclable Holographic Storage Media." RCA REV 33:227–247, 1972; F. S. Chen, "Modulators for Optical Communications," *Proceedings of the IEEE* 58 (10):1440–1457, 1970; B. Ellis, A. K. Walton, "A Bibliography on Optical Modulators," *Physics,* Vol. 11, PP 85–97 Pergamon Press, Great Britain, 1976; J. P. Flannery, "Light-Controlled Light Valves," *IEEE Trans Electron Devices, ED-*20:943–953, 1973; V. J. Fowler & J. Schlafer, "A Survey of Laser Beam Deflection Techniques," *Applied Optics* 5(10):1675–1682, 1966; G. R. Fowles, *Introduction to Modern Optics,* New York, Rinchart & Winston, 1968; P. Grat, "Modulators And Deflectors," *Alta Frequenza,* 41 (10):726–743, 1972; I. P. Kaminow & E. H. Turner, "Electro-optic Light Modulators," *Applied Optics,* 5 (10):1612–1628, 1966; I. P. Kaminow & E. H. Turner, "Linear Electro-optical Materials," *Handbook of Lasers (R. J. Presley Ed.) pp.* 447–459, Chemical Rubber Company, Cleveland, Ohio, 1971; I. P. Kaminow, *An Introduction to Electro-optic Devices,* New York, Academic Press, 1974.

Figure 3:
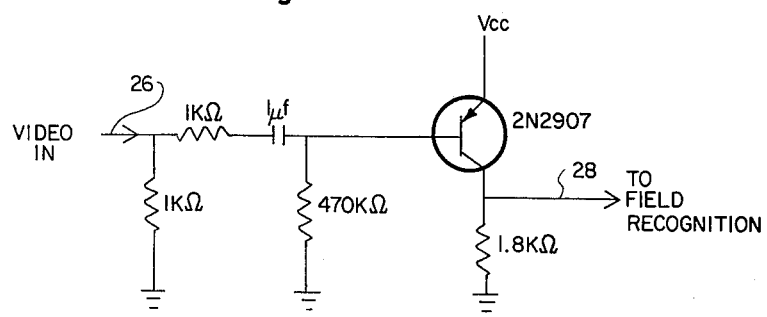
FIG. 3 is a synchronization pulse separator circuit of the type which may be used in the embodiment herein disclosed.
Figure 4:
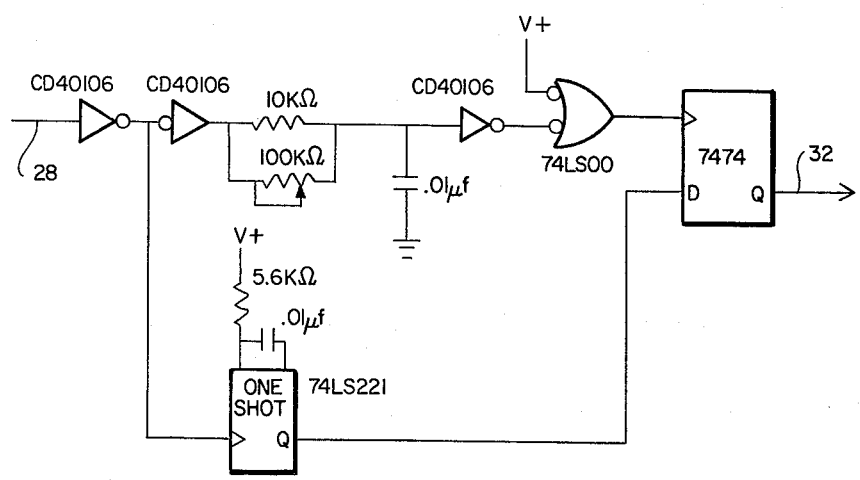
FIG. 4 is a representative field recognition circuit of the type which may be used in the embodiment disclosed.

Referring back to FIG. 1, the stereoscopic viewer system of the instant invention is shown in simplified block diagram format. The stereoscopic viewer system receives an input, as shown in FIG. 1, from a left-right stereoscopic image pair production system. To receive the synchronizing signal from a composite video signal as delivered on the composite video signal line 12, a synchronization separator 24 must be employed. A synchronization separator circuit useful for the purposes herein illustrated is depicted in FIG. 3. The output of the synchronization separator circuit 24 is supplied to a field recognition circuit 30, a representative example of which is shown in FIG. 4.

As hereinbefore discussed, the power supply 36 may by any convenient source of electrical power available in or from the left-right stereoscopic image pair production system. Alternately, it may be any conventional commercial power supply available to supply power as necessary to the oscillator circuit 40. One such power supply is available from the Power One Corporation. Model No. AA15-0.8 has been found useful for the RF circuit-type system illustrated in FIG. 1 and as herein discussed.

FIG. 3 is an example of a synchronizing signal separator circuit 24. It extracts the synchronizing signal from the video signal and supplies it to the field view recognizer circuit 30 via conductor 28. An example of a field view recognizer circuit 30 is shown in FIG. 4. The circuit 30 operates to detect odd and even field scans in a video system having odd and even scans, or to detect left and right eye views in other systems. The odd and even field scans are preselected to be the left and right eye views (or the reverse), and in turn control the perspective (normal or inverted view) observed by the user. The field recognizer circuit notes the presence (or absence) of the odd or even field scan signal as selected. The presence of an odd or even field scan signal is communicated through the transmission means 34 and transmitter 46 to the receiving means 50 in, for example, the form of the modulated signal. Signal frequency, band width, amplitude duration or other characteristics can easily be used to communicate the presence of the odd or even field scan (left or right eye views) so that the appropriate left or right shutter 66 or 68 is open in synchronization with the presentation of the view on the screen 22.

In the preferred implementation, the synchronization signal for each view would be uniquely identified, such as by using different pulse widths with pulse width modulation, different frequencies with frequency modulation, or different carrier frequencies, for each view's signal. This would permit the receiver circuitry to identify which eye's shutter should be open and which closed, should the transmission of the synchronization signal by interrupted and then restored. Such interruption might occur if the user turned his head far enough away from the transmitter so that the portable stereoscopic viewer's receiver was screened from the signal. In another implementation, the synchronization signal transmitted might carry modulation identifying only the transition from one eye's (e.g., the left eye's) view to the other eye's (e.g., the right eye's) view. The portable stereoscopic viewer's circuitry would switch the electro-optic shutters to the proper positions for the opposite transition at the proper length of time later. This would only be successful where the duty cycle and alternation frequency were constant, as in the case of a video signal and display. In another implementation, which could be employed with any of these synchronization signals, a switch could be added to the portable stereoscopic viewer's circuitry to permit the user to control the phase of the shutter's operation with respect to the views displayed.

Figure 5:
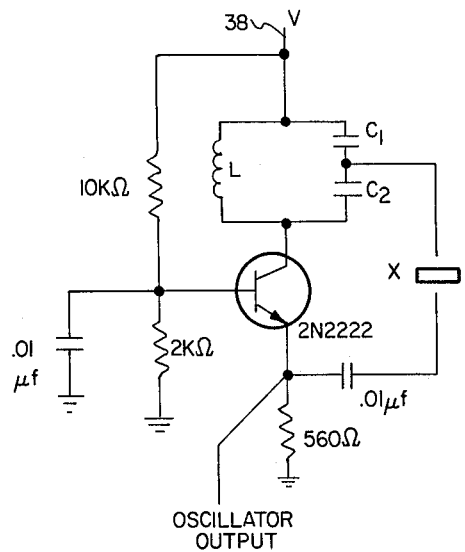
FIG. 5 is a representative oscillator circuit for use in the stereoscopic viewer system of the instant invention.
Figure 6:
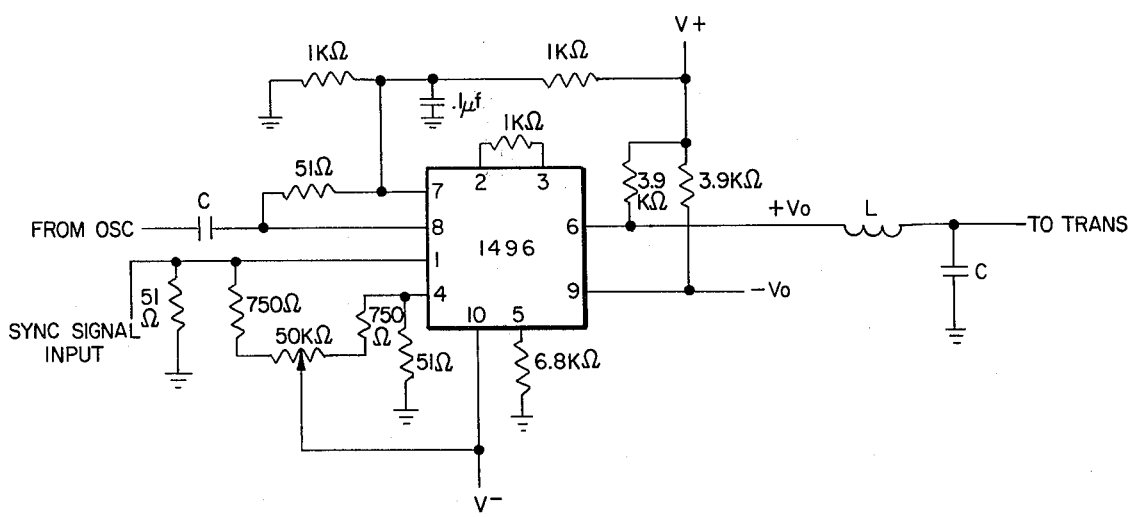
FIG. 6 is a representative modulator circuit for use in the stereoscopic viewer system of the instant invention.

FIG. 5 is an example of an oscillator circuit 40 which may be used for an RF system. FIG. 5 illustrates a crystal Colpitts-type oscillator known to those skilled in the art. The capacitors $C_1$ and $C_2$ and the inductor L are selected for the desired output frequency. FIG. 6 is an illustration of a modulator circuit 42 for use in an RF stereoscopic viewer system of the instant invention. The output of the modulator circuit 42 is supplied via conductor 44 to a transmitting antenna 46, as hereinbefore discussed. The receiver antenna 52 receives the RF signal and delivers it via conductor 54 to the detector demodulator 56. In an RF circuit application, those skilled in the art will recognize that a combination of the oscillator circuit illustrated in FIG. 5 and the modulator circuit illustrated in FIG. 6 can act as an acceptable detector demodulator 56. This can be accomplished by using as one input to the mixer (shown as the modulator, component No. 1496, in FIG. 6) a signal from an oscillator in the receiver means and using the received signal from the antenna 52 via conductor 54 as the other input.

Figure 7:
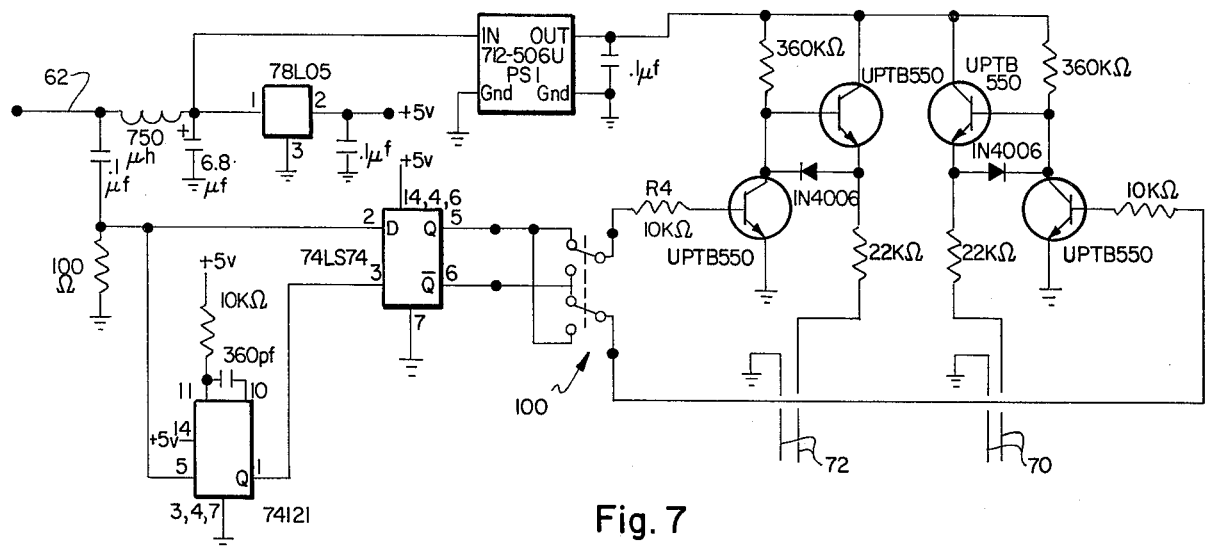
FIG. 7 is a representative switching logic circuit for use in the stereoscopic viewer system of the instant invention.

The output of the detector and demodulator 56 is supplied via conductor 62 to switching logic 64. An example of switching logic circuitry is shown in FIG. 7. The switching logic causes the proper voltage derived from a separate independent power source 58 (and possibly increased in voltage through a DC to DC inverter or converter technique well known to those skilled in the art and commercially available from manufacturers such as Indicot Coil Corporation) to be applied in the current time synchronization to cause the electro-optic shutters 66 and 68 to switch between maximum and minimum transmission states. Thus, the user is able to perceive a stereoscopic image.

Figure 8:
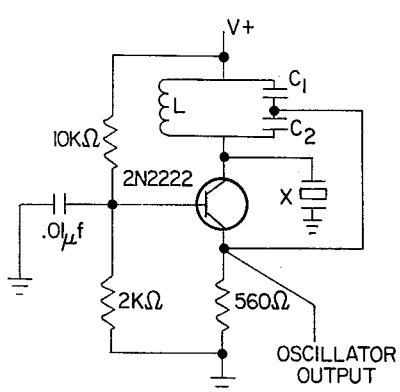
FIG. 8 is a representative sample of the acoustic oscillator circuit for use in the stereoscopic viewer system of the instant invention.
Figure 9:
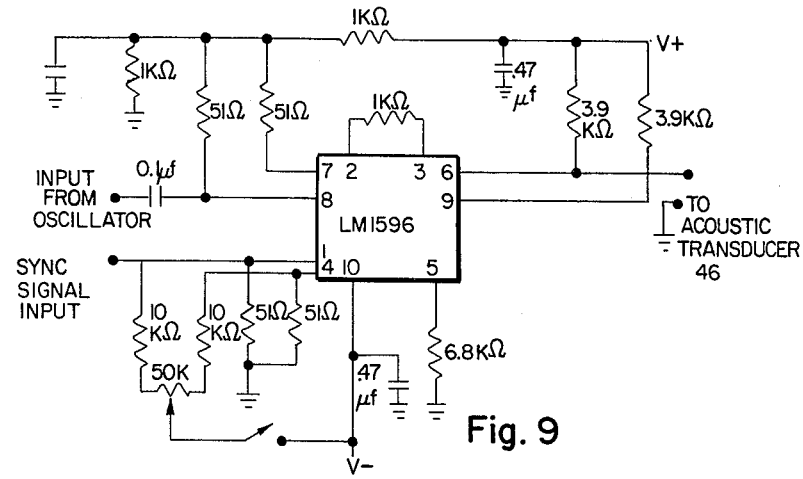
FIG. 9 is a representative sample of an acoustic modulator circuit for use in the stereoscopic viewer system of the instant invention.

For stereoscopic viewer systems in which the transmitted modulated signal may be regarded as acoustic, the power supply 36 may be a power supply similar to that used for an RF system. That is, Model AA15-0.8 made by Power One Corporation has been found to be adequate. An acceptable acoustic oscillator capable of acting as the oscillator circuit 40 is exemplified by the circuit shown in FIG. 8. The oscillator there shown is a crystal oscillator which supplies an output to an acoustic modulator circuit such as the one shown in FIG. 9. The output of the modulator signal is supplied to a commerically available acoustic transducer which generates an acoustic field. This acoustic field is received by a commercially available acoustic transducer acting as the receiver 52.

Figure 10:
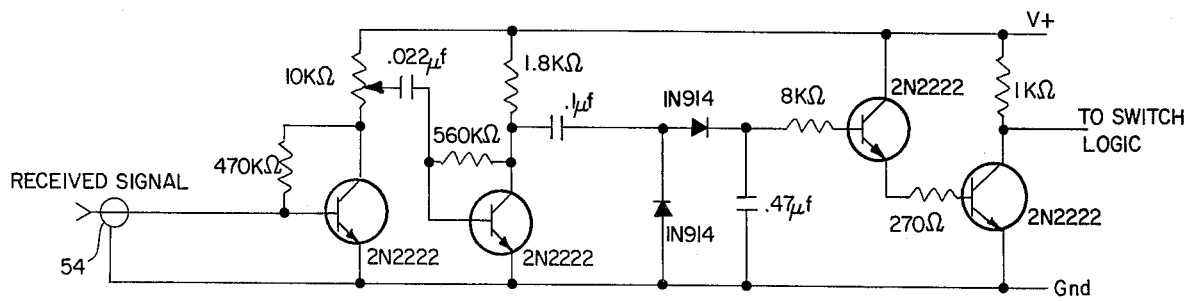
FIG. 10 is a representative detector demodulator circuit for use in the stereoscopic viewer system of the instant invention.

The received signal again is supplied to a detection and a demodulation circuit. A representative example of such a circuit is shown as FIG. 10. The detector demodulator circuit 56 extracts the synchronization signal, which is in turn fed to a switching logic circuit 64 such as those heretofore illustrated in FIG. 7. It may be noted that the switching logic circuit of FIG. 7 has a switch 100 which is used to switch the signal received in orientation from left-right to right-left or the reverse, as the case may be, in order to change the perception of the observed image by the user from a frontward oriented or one extending outward toward the viewer from the screen to one extending rearward behind the screen 22. The switch 100 may be positioned for easy operation by the user, as hereinafter discussed.

Figure 11:
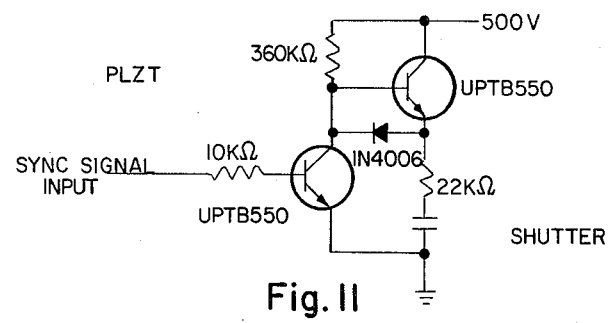
FIG. 11 is a representative optical modulator circuit for use in the stereoscopic viewer system of the instant invention.

For stereoscopic viewer systems in which the transmitter 46 is optical, an acceptable power supply 36 is a Model B5-3 manufactured by the Power One Corporation. The power supply 36 supplies power to an optical source. Examples of such sources, which may be coherent or incoherent, are light emitting diodes, infrared emitting diodes, solid state or gas lasers, flash lamps, and incandescent lights. An example of a source using an infrared emitting diode is module TIXL 472 manufactured by Texas Instrument Corporation. The light from the optical source is modulated by an optical modulator acting as the modulator 42. It causes the synchronization signal to be coded into the form of light involved. Examples of such modulators include devices employing electro-optic and magnetic-optic effects illustrated in the circuits heretofore. In fact, the PLZT shutter may be used as such a modulator. FIG. 11 is an example of a modulator circuit using a PLZT shutter. The modulated light signal then passes through an optical transmitting device which could be a simple diverging lens which will act as the transmitter 46. The receiver 52 may be a simple converging lens with a filter. Other receiving and transmitting optical configurations are known to those skilled in the art and may be employed as desired to improve the overall transmission signal to noise ratio. The received light is detected in an optical detector and demodulator 56 such as Model TIXL 471 manufactured by Texas Instrument Corporation. The signal is transformed into an electrical signal which is fed further into detector demodulator circuitry which is part of the detector demodulator 56. A representative example has heretofore been illustrated as FIG. 10. The output of the detector demodulator 56 is further supplied to switching logic circuitry heretofore illustrated in FIG. 7. The switching logic 64 causes the proper voltage derived from the power supply (i.e., battery) 58, increased as necessary through a DC to DC inverter, to be applied in the correct time synchronization to cause the electro-optic shutters 66 and 68 to operate in the desired manner. In an optical system, such as the one discussed, the power is supplied directly to an optical course such as in module TIXL 472 manufactured by Texas Instruments with a modulation fed into pin A of such a module. Resulting light produced by the optical source is modulated by the synchronization information. Operation thereafter is similar in the optical system heretofore discussed.

Figure 12:
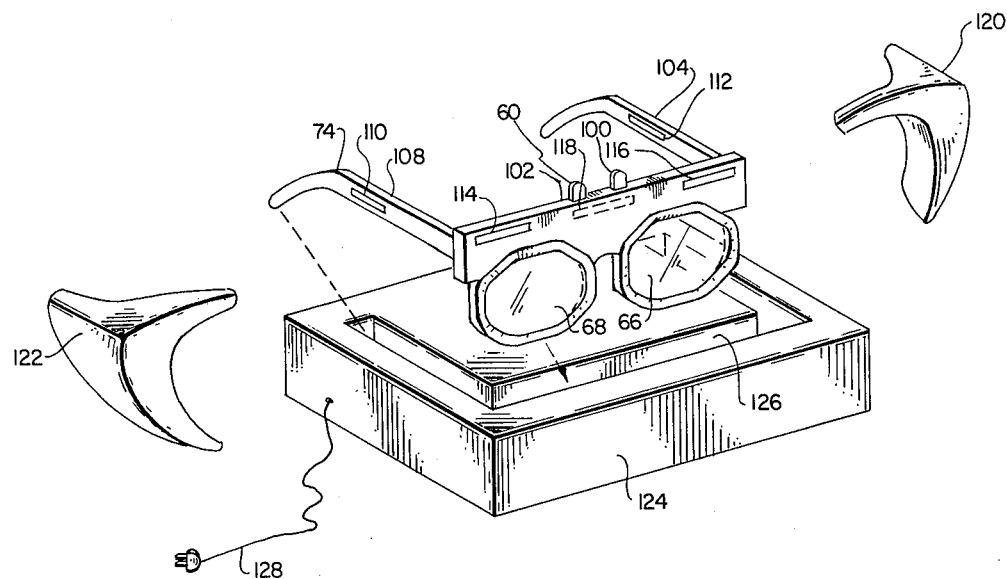
FIG. 12 is a perspective view of a stereoscopic viewer of the instant invention.

FIG. 12 shows a stereoscopic viewer with respective left 66 and right 68 electro-optic shutters. The shutters 66 and 68 are mounted in eye glass frames 74, here illustrated as quite sturdy. The frames 74 may be virtually any structure to position something proximate the eyes, including goggles and helmets. The frames 74 include a shutter frame 102 with respective left 104 and right 108 stems or ears. Physically small batteries 110 and 112 may be positioned in the ear members of the eye glass frame 74. They may be connected by wires, not here shown, to supply power to a detector demodulator circuit 56 (FIG. 1) mounted in the frame 114. Switching logic 64 may be interconnected and positioned within the frame 74 as shown at 116 with interconnecting conductors 70 and 72 not shown. The receiver antenna may also be positioned in the frame as shown at 118. The various devices of the receiving means 50 are thus positioned within the eye glass frame 74 to provide a highly portable compact unit for easy wear by the user. The device illustrated in FIG. 12 also includes a pair of light shields 120 and 122 which may be sized and adapted to snap onto the eye glass frames 74 to block background or extraneous light from the eyes of the user and thus improve the intensity of the image perceived by the user. This is particularly useful in environments where background or extraneous light, such as that which may be observed from overhead room lights, would interfere with the quality of the image perceived by the user.

The stereoscopic viewers shown in FIG. 12 also have a tray 124 positioned thereunder with an opening 126 sized to receive the viewer, and in particular the viewer frame 74. The tray 124 may be any kind of structure to support the assembly when not in use as well as for an automatic recharging system for the rechargeable batteries 110 and 112 positioned in the ears or stem 108 and 104. A cord 128 is shown to reflect the source of charging power to be a conventional 115 volt AC power outlet.

Figure 13:
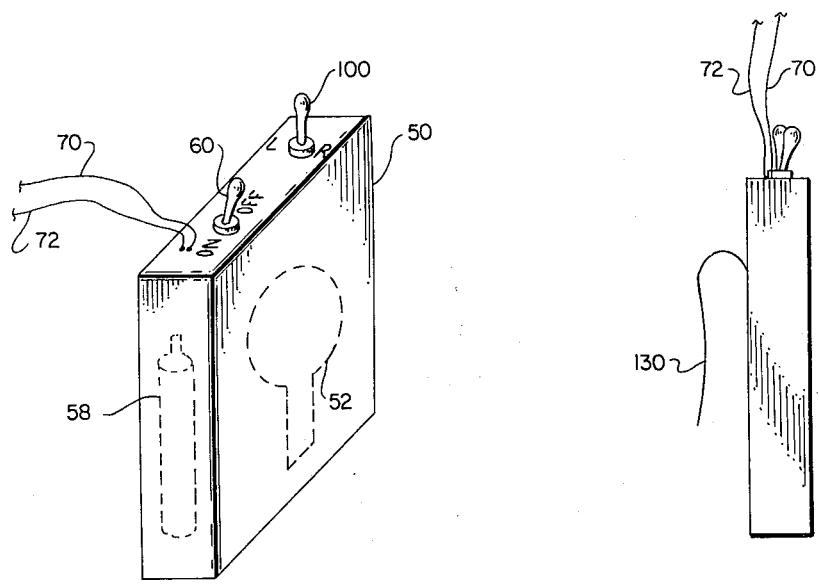
FIG. 13 is a perspective view of a remote receiving means for the stereoscopic viewer system of the instant invention.

FIG. 13 shows a belt or pocket circuit pack which may contain the receiving means 50, as illustrated in FIG. 1. A dotted line is used to show the antenna 52 which acts as the receiver 52. Also illustrated in dotted line format is a battery to act as the power supply 58. The left-right switch 100 of the switching logic 64, as heretofore illustrated in FIG. 7, is shown on the box of receiving means 50. The on-off switch 60 is also illustrated. The conductor means 70 and 72 are shown leading toward the shutters 66 and 68 mounted in appropriate frames 74 for positioning. With respect to FIG. 12, such on-off switches may be placed on the eye glass frame structure 74.

Figure 14:
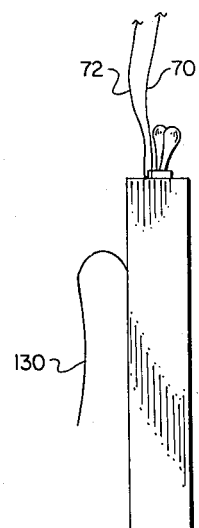
FIG. 14 is the side view of the receiving means illustrated in FIG. 13.

FIG. 14 is a side view of the box or receiving means 50 of FIG. 13 to illustrate a belt or pocket clip 130 for hooking the receiving means onto the belt or shirt pocket of the user.

Figure 15:
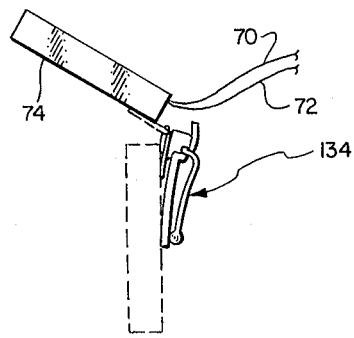
FIG. 15 is a side view of the stereoscopic viewer for use with the stereoscopic viewer system of the instant invention as an alternate positioning means.

FIG. 15 illustrates an eye glass clip for persons who already wear eye glasses or spectacles. A side view of the stereoscopic viewer frame structure 74 is shown with a clipping mechanism 134 associated therewith. The stereoscopic viewers are positioned within frame structure 74 to be lifted from a lower position shown in dotted lines to a raised position shown in solid in FIG. 15.

Referring back to FIG. 12, it may be noted that the antenna 118 is illustrated in the eye glass frame structure 74. Those skilled in the art will recognize that an antenna has many characteristics and can be selected to be directional. Depending on direction or orientation of the antenna to the transmitter 46, the antenna will generate or receive more or less signal. A signal level detector can be included with or associated with the antenna and set so that it will pass a signal to the detector demodulator 56 only upon the existence of a preselected level of received signal. The preselected level of received signal can be selected so that, in conjunction with the directional characteristic of the antenna, the user must have the antenna (and in turn his head) oriented toward a preselected point (i.e., the screen 22) related to the perceived image. With minor modification to the switching logic 64, the absence of a signal from the detector demodulator 56 can produce a maximum transmission signal to both shutters 66 and 68. Thus, in use, the wearer can turn his/her head away from the viewing screen 22 (to observe, to converse, to walk away and so forth) and have the benefit of vision through both eyes. That is, the switching logic 64 can be modified so that both the left 66 and right 68 electro-optic shutters switch to the maximum transmission state to permit the user to have substantially normal vision through the shutters. Thus, the user in operation may from time to time turn his head to an orientation away from the screen and immediately obtain acceptable vision for seeing or observing, reading or otherwise acting with the benefit of his eyesight uninterrupted by the switching and in turn reduced light transmission effected by operation of the stereoscopic viewer system receiving means 50. Those skilled in the art will recognize that a directional receiver, as well as the development of an effective modified switch 100 or switching logic 64 to act to cause both shutters to go to a maximum transmission are readily available commercially and are otherwise available to the rudimentarian.

It is to be understood that the embodiments of the invention above-described are merely illustrative of the application of the principals of the invention. Reference herein to details of the illustrated embodiment is not intended to limit the scope of the claims which themselves recite those features regarded as essential to the invention.

We claim:

1. A stereoscopic viewer system for monitoring a synchronized left-right stereoscopic image pair, said system comprising:
  transmission means connected to receive a synchronizing signal from left-right stereoscopic image pair production means, said transmission means including:
    first power supply means connected to supply power,
    carrier generator means connected to said power supply means to receive power therefrom and to generate a carrier signal,
    modulator means connected to receive the carrier signal and said synchronizing signal, said modulator means generating as an output the carrier signal modulated by the synchronizing signal, and
    transmitter means connected to receive the modulated signal output from the modulator means and to transmit same into the surrounding medium;

receiving means positioned remote from said transmission means to receive the modulated carrier signal and generate a switching signal, said receiving means having:
  receiver means to receive the transmitted modulated carrier signal from the medium,
  a rechargeable battery connected to supply power,
  demodulator means connected to receive power from the power supply means and to receive the modulated carrier signal from the receiving means to extract the synchronization signal therefrom,
  switching logic to receive the synchronization signal and to generate a switching signal;
a pair of electro-optic shutter means each connected to said switching logic to receive said switching signals to selectively and in accordance with the synchronizing signal alternately operate each of said shutters between maximum and minimum optical transmission states;
eyeglass means in mechanical association with the electro-optic shutters for positioning each of said electro-optic shutters in the line-of-sight of one of the eyes of a user, said eyeglass means having said receiving means positioned therein; and
tray means sized to receive said glass means and support same, said tray means having means positioned and operable to recharge said rechargeable batteries.

2. A stereoscopic viewer system for monitoring a synchronized left-right stereoscopic image pair, said system comprising:
  transmission means connected to receive a synchronizing signal from left-right stereoscopic image pair production means, said transmission means including:
    first power supply means connected to supply power,
    carrier generator means connected to said power supply means to receive power therefrom and to generate a carrier signal,
    modulator means connected to receive the carrier signal and said synchronizing signal, said modulator means generating as an output the carrier signal modulated by the synchronizing signal, and
    transmitter means connected to receive the modulated signal output from the modulator means and to transmit same into the surrounding medium;
  receiving means positioned remote from said transmission means to receive the modulated carrier signal and generate a switching signal, said receiving means having:
    receiver means to receive the transmitted modulated carrier signal from the medium,
    second power supply means connected to supply power,
    demodulator means connected to receive power from the power supply means and to receive the modulated carrier signal from the receiver means to extract the synchronization signal therefrom,
    switching logic to receive the synchronization signal and to generate a switching signal;
  a pair of electro-optic shutter means each connected to said switching logic to receive said switching signals to selectively and in accordance with the synchronizing signal alternately operate each of said shutters between maximum and minimum optical transmission states;
  positioning means in mechanical association with the electrooptic shutters for positioning each of said electrooptic shutters in the line-of-sight of one of the eyes of a user; and
  wherein said switching logic has means to supply simultaneous switching signals to both said electro-optic shutters to cause both said shutters to maintain a maximum optical transmission state in the absence of a synchronizing signal from said receiver means via said demodulator means.

3. The system of claim 2 wherein said carrier generator generates a carrier signal in the acoustical spectrum, said transmitter means is an acoustical transducer and wherein said receiver means is an acoustical transducer.

4. The system of claim 2 wherein said carrier generator generates a carrier signal in the optical spectrum, said transmitter means is a projector of optical signals and wherein said receiver means is a detector of optical signals.

5. The system of claim 2 wherein said second power supply means is a battery.

6. The system of claim 2 wherein said electro-optic shutter means is a lanthanum modified lead zirconate titanate electro-optic shutter.

7. The system of claim 2 wherein said electro-optic shutter means is a liquid crystal electro-optic shutter.

8. The system of claim 2 wherein said receiver means is a directional receiver and receives signals from said transmitter only when preselectedly oriented toward a preselected point.

9. The system of claim 2 wherein said receiving means includes on-off switch means connected to turn said second power supply means on and off as desired.

10. The system of claim 2 wherein said receiving means is positioned in a chassis for positioning about the person of the viewer remote from said shutters and wherein said receiving means is connected to said shutters by conductor means.

11. The system of claim 18 wherein said stereoscopic image pair production means is a television system supplying alternating left and right images as odd and even field scans in a composite video signal, and wherein said system further includes:
  separator means connected to receive the composite video signal to separate therefrom the field scans; and
  a field view recognizer circuit connected to said separator means to receive synchronizing signals therefrom to differentiate between odd and even field scans to supply a correlated left-right synchronizing signal to the transmission means.

12. The system of claim 2 wherein said receiving means includes orientation switch means connected to reverse the left-right images perceived by the respective left and right eyes of the viewer to change the orientation of the perceived stereoscopic image.

13. The system of claim 2 wherein said segment includes structure affixed to said positioning means to substantially block background light from the eyes of the user.

14. The system of claim 2 wherein said carrier generator generates electro-magnetic signals at a radio frequency selected so that the receiver means is sized to fit within said positioning means, said transmitter means is a projector of electro-magnetic signals and wherein said receiver means is a receiver of electro-magnetic signals.

15. The system of claim 14 wherein the output from said modulator means is a suppressed carrier signal.

16. The system of claim 14 wherein the output from the modulator means is a pulse modulated signal.

17. The system of claim 2 wherein said positioning means is an eyeglass frame structure.

18. The system of claim 17 wherein said eyeglass frame structure has said receiving means in mechanical association therewith.

* * * * *

UNITED STATES PATENT OFFICE
CERTIFICATE OF CORRECTION

Patent No. 4,424,529                    Dated   January 3, 1984

Inventor(s)  John A. Roese and A. Franklin Turner

It is certified that error appears in the above-identified patent and that said Letters Patent are hereby corrected as shown below:

Column 1, line 14, between "to" and "stereoscopic" insert ---a---;

Column 3, line 28, change "by" to ---be---;

Column 5, line 62, delete "and";

Column 6, line 38, change "trnsmitter" to ---transmitter---;

Column 6, line 39, change "electroc-magnetic" to ---electro-magnetic---;

Column 10, line 39, change "by" to ---be---;

Column 11, line 60, change "current" to ---correct---;

Column 12, line 67, change "course" to ---source---;

UNITED STATES PATENT OFFICE
CERTIFICATE OF CORRECTION

Patent No. 4,424,529    Dated January 3, 1984

Inventor(s) John A. Roese and A. Franklin Turner

It is certified that error appears in the above-identified patent and that said Letters Patent are hereby corrected as shown below:

Column 16, line 42 (Claim 11), change "18" to ---2---.

Signed and Sealed this

First Day of May 1984

[SEAL]

Attest:

GERALD J. MOSSINGHOFF

Attesting Officer    Commissioner of Patents and Trademarks